(12) United States Patent
Fujiwara

(10) Patent No.: US 8,136,498 B2
(45) Date of Patent: Mar. 20, 2012

(54) TWO-PLANE TYPE CRANKSHAFT

(75) Inventor: Hideki Fujiwara, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 574 days.

(21) Appl. No.: 12/423,381

(22) Filed: Apr. 14, 2009

(65) Prior Publication Data

US 2009/0255503 A1 Oct. 15, 2009

(30) Foreign Application Priority Data

Apr. 14, 2008 (JP) ................................ 2008-104247

(51) Int. Cl.
*F02B 75/06* (2006.01)
*F02B 75/32* (2006.01)
*F16C 11/00* (2006.01)

(52) U.S. Cl. ............... 123/192.2; 123/192.1; 123/197.4; 74/603

(58) Field of Classification Search ............... 123/192.1, 123/192.2
See application file for complete search history.

(56) References Cited

U.S. PATENT DOCUMENTS

| | | | | |
|---|---|---|---|---|
| 4,966,042 A | * | 10/1990 | Brown | 74/44 |
| 5,038,731 A | * | 8/1991 | Shimada | 123/192.2 |
| 6,164,259 A | * | 12/2000 | Brogdon et al. | 123/192.2 |
| 6,205,970 B1 | * | 3/2001 | Iwata et al. | 123/192.2 |
| 6,959,683 B2 | * | 11/2005 | Gokan | 123/192.1 |
| 7,434,560 B2 | * | 10/2008 | Ohsawa | 123/192.2 |
| 7,669,573 B2 | * | 3/2010 | Ogasawara et al. | 123/192.2 |
| RE42,841 E | * | 10/2011 | Oishi et al. | 123/195 R |
| 2003/0164259 A1 | * | 9/2003 | Morii | 180/292 |
| 2004/0173176 A1 | * | 9/2004 | Kawakubo et al. | 123/192.1 |
| 2005/0107194 A1 | * | 5/2005 | Oishi et al. | 474/28 |

FOREIGN PATENT DOCUMENTS

JP   61-119842   6/1986
JP   7-76577    8/1995

* cited by examiner

*Primary Examiner* — Marguerite McMahon
*Assistant Examiner* — Tea Bajramovic
(74) *Attorney, Agent, or Firm* — Keating & Bennett, LLP

(57) ABSTRACT

An engine 20 includes a two-plane type crankshaft 30 and a balancer shaft 50 for reducing a primary couple of the balancer shaft 50. The crankshaft 30 includes a crankshaft body 30a and a first gear 38. The first gear 38 is disposed at one axial end side of a first crank web pair 31a disposed at the outermost one axial end side of the crankshaft 30. In the engine 20 including the two-plane type crankshaft, the weight of the engine can be reduced while securing high reliability.

16 Claims, 13 Drawing Sheets

TWO-PLANE TYPE CRANKSHAFT

This application claims priority under 35 U.S.C. §119 to Japanese Patent Application No. 2008-104247 filed on Apr. 14, 2008, the entire disclosure of which is incorporated herein by reference in its entirety.

BACKGROUND

1. Field of the Invention

The preferred embodiments of the present invention relate, inter alia, to an engine having a two-plane type crankshaft, and a vehicle equipped with the engine.

2. Description of the Related Art

The following description sets forth the inventor's knowledge of related art and problems therein and should not be construed as an admission of knowledge in the prior art.

An engine equipped with the so-called two-plane type crankshaft is disclosed in, for example, Japanese Examined Laid-open Patent Publication No. H07-76577 (hereinafter referred to as "Patent Document 1"). The two-plane type crankshaft is equipped with a first pair of crank pins mutually different in phase by 180 degrees and a second pair of crank pins different in phase by 90 degrees from the first pair of crank pins and mutually different in phase by 180 degrees.

Employment of the two-plane type crankshaft can substantially prevent occurrence of the primary and secondary inertia forces, and the secondary couple. Hence, combination of the two-plane type crankshaft and a primary couple eliminating balancer shaft makes it possible to substantially prevent occurrence of all of the primary and secondary inertia forces and the primary and secondary couples.

FIG. 13 is a partially broken cross-sectional view of an engine 100 disclosed in the aforementioned Patent Document 1. As shown in FIG. 13, the engine 100 is equipped with a two-plane type crankshaft 101. At the front side of the crankshaft 101 (i.e., the right side in FIG. 3), a balancer shaft 102 for canceling the primary couple is arranged. The crankshaft 101 has, at its axial central portion, a gear 101a. The crankshaft 101 is in engagement with the balancer shaft 102 via the gear 101a.

Generally speaking, from the viewpoint of reducing the force to be exerted on the crankshaft due to the resonance of the crankshaft, it is preferable to set the rotation speed of the crankshaft at which the resonance thereof reaches the peak to be higher. It is more preferable to set the rotation speed of the crankshaft at which the resonance thereof reaches the peak to be higher than a regularly used rotation speed range of the crankshaft.

Considering the disposition balance of inertia mass of the crankshaft, a concentric arrangement of the inertia mass at the vicinity of the axial center portion of the crankshaft tends to cause raising of the rotation speed of the crankshaft at which the resonance thereof reaches the peak. For this reason, also in the crankshaft 101 disclosed in the aforementioned Patent Document 1, the gear 101a is disposed approximately at the axial central portion of the crankshaft 101.

However, arranging a gear engaged with a balancer shaft approximately at the axial center of the crankshaft tends to increase the length of the crankshaft. The more the length of the crankshaft is increased, the more the weight of the crankshaft is increased. Hence, the force in a torsional direction to be exerted on the crankshaft is rather increased due to the torsional resonance of the crankshaft. This necessitates the increased diameter of the crankshaft to secure the reliability thereof. As a consequence, the weight of the crankshaft is further increased, which in turn further increases the force in the torsional direction to be exerted on the crankshaft due to the torsional resonance of the crankshaft.

In cases where the gear engaged with the balancer shaft is disposed substantially at the axial center of the crankshaft considering the disposition balance of the inertia mass of the crankshaft, it is difficult to reduce the weight of the engine while securing high reliability of the engine.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an engine having a two-plane type crankshaft capable of implementing weight reduction while securing high reliability.

Among other potential advantages, some embodiments can provide a vehicle equipped with the aforementioned engine.

According to the first aspect of the present invention, an engine includes: a crankshaft including a crankshaft body and a first gear mounted on the crankshaft body, wherein the crankshaft includes first, second, third, and fourth crank web pairs each having a pair of crank webs and sequentially disposed from one axial end side of the crankshaft to the other axial end side thereof, a first crank pin interconnecting the pair of crank webs of the first crank web pair, a second crank pin interconnecting the pair of crank webs of the second crank web pair and different in phase by 90 degrees from the first crank pin, a third crank pin interconnecting the pair of crank webs of the third crank web pair and different in phase by 180 degrees from the second crank pin, and a fourth crank pin interconnecting the pair of crank webs of the fourth crank web pair and different in phase by 180 degrees from the first crank pin; and a balancer shaft for reducing a primary couple of the crankshaft, the balancer shaft including a second gear engaged with the first gear, wherein the first gear is disposed at one axial end side of the first crank web pair.

According to the aforementioned engine, the engine can be reduced in weight while securing high reliability.

In the aforementioned engine, it can be configured such that the first gear is formed separately from the crankshaft body.

In the aforementioned engine, it can be configured such that the crankshaft body further includes a crank journal extending from the first crank web pair to the one axial end side of the crankshaft, and wherein the first gear is press-fitted onto the crank journal.

In the aforementioned engine, it can be configured such that the engine further including a crankcase configured to store the crankshaft, wherein the crankshaft body further includes a first crank journal extended from the first crank web pair to the one axial end side of the crankshaft and provided with the first gear mounted thereon, and a second crank journal interconnecting the first crank web pair and the second crank web pair, and wherein the crankcase includes a first bearing portion supporting the first crank journal, and a second bearing portion supporting the second crank journal.

In the aforementioned engine, it can be configured such that the balancer shaft further includes a balancer shaft body having the second gear mounted thereon, a first weight portion that rotates with the balancer shaft body, and a second weight portion that rotates with the balancer shaft body and that is different in phase by 180 degrees from the first weight portion, wherein the first weight portion is disposed between the pair of crank webs of the first crank web pair in an axial direction of the crankshaft, and the second weight portion is disposed between the pair of crank webs of the third crank web pair in the axial direction of the crankshaft.

In the aforementioned engine, it can be configured such that the balancer shaft further includes a balancer shaft body having the second gear, and the second gear includes a first gear portion provided non-rotatably with respective to the balancer shaft body and including a first counter portion;

a second gear portion provided non-rotatably with respective to the balancer shaft body and including a second counter portion opposing the first counter portion in a rotation direction of the balancer shaft; and a damper disposed between the first counter portion and the second counter portion.

According to the second aspect of the present invention, an engine comprising:

a crankshaft including first, second, third, and fourth crank web pairs each having a pair of crank webs and sequentially disposed from one axial end side of the crankshaft to the other axial end side thereof, a first crank pin interconnect the pair of crank webs of the first crank web pair, a second crank pin interconnecting the pair of crank webs of the second crank web pair and different in phase by 90 degrees from the first crank pin, a third crank pin interconnecting the pair of crank webs of the third crank web pair and different in phase by 180 degrees from the second crank pin, and a fourth crank pin interconnecting the pair of crank webs of the fourth crank web pair and different in phase by 180 degrees from the first crank pin, wherein a gear is formed on an outer crank web of the pair of crank webs of the first crank web, the outer crank web being located at one axial end side of the crankshaft; and a balancer shaft for reducing a primary couple of the crankshaft, the balancer including a gear engaged with the outer crank web.

According to the third aspect of the present invention, a vehicle is provided that includes any one of the aforementioned engines.

In this disclosure, the "degrees" mentioned are preferably close to or at the indicated values. However, in some embodiments, the values may be about equal to the indicated values (e.g., within a range near to or within a few degrees from such values).

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

An embodiment of a vehicle according to one preferred embodiment of the present invention will be described below with reference to a motorcycle 1 shown in FIG. 1. It should be noted, however, that the vehicle according to this embodiment is not limited to the type of motorcycle 1 shown in FIG. 1. The vehicle according to the present invention can be, for example, a four-wheel vehicle or a straddle-type vehicle. In this disclosure, it should be understood that the four-wheel vehicle includes a side-by-side vehicle (SSV) (e.g., in which at least some passengers seats are situated side-by-side). Side-by-side vehicles are often constructed for off road use and referred to as "off-road vehicles." In this disclosure, the "straddle-type vehicle" indicates a vehicle of a type in which a rider straddles the vehicle (e.g., straddling a seat thereof). The terminology straddle-type vehicle also includes, for example, motorcycles (on and/or off road motorcycles, scooters, mopeds, etc.), all terrain vehicles (ATVs), vehicles with two or more wheels, and vehicles with less than two wheels, such as snowmobiles. In the present application, the terminology "motorcycle" refers to a motorcycle in a broad sense. Here, the language "motorcycle in a broad sense" includes all types of motorcycles, including, on and/or off road motorcycles, scooters, mopeds, off-road vehicles with varied numbers of wheels, etc. The terminology motorcycle as used herein, thus, also includes vehicles that have one or more front and/or rear sets of wheels that has multiple wheels. In general, most motorcycles are configured such that during changing of the travel direction, a rider inclines the vehicle body.

General Structure of Motorcycle 1:

First of all, the general structure of the motorcycle 1 will be described with reference to FIG. 1. In the following description, the frontward, rearward, leftward, and rightward directions are defined herein to be as viewed from the rider sitting on a seat 9 of the motorcycle 1.

Figure 1:
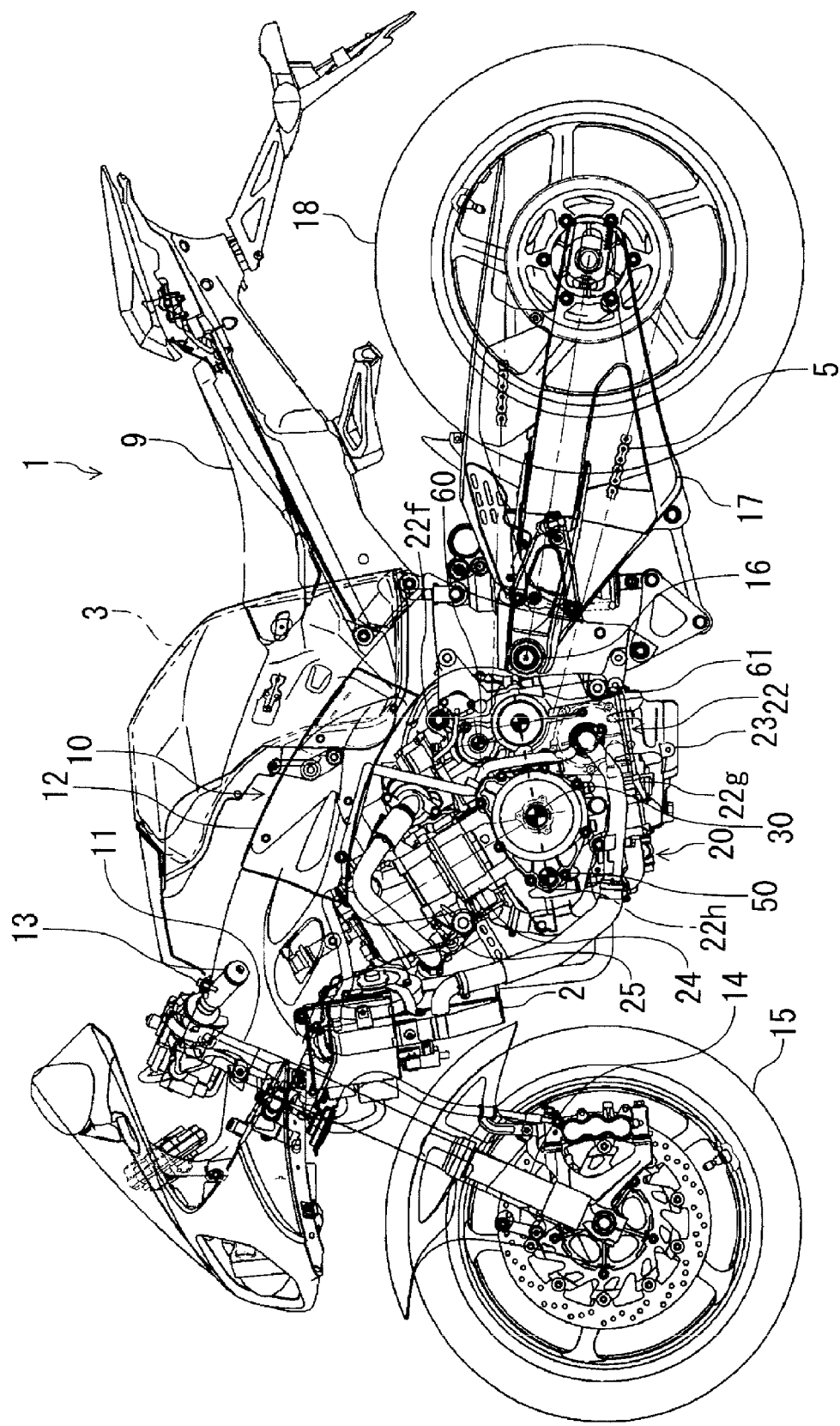
FIG. 1 is a left side view of a motorcycle according to an embodiment of the present invention.

FIG. 1 is a left side view of a motorcycle 1 according to a first embodiment. As shown in FIG. 1, the motorcycle 1 includes a vehicle body frame 10. The vehicle body frame 10 includes a head pipe 11 and a main frame 12. The head pipe 11 is disposed at the vehicle's front side portion. The main frame 12 extends obliquely downward and rearward from the head pipe 11.

In the head pipe 11, a steering shaft (not shown) is inserted in a rotatable manner. Connected to the steering shaft are a handle bar 13 and a pair of front forks 14. At the lower end portions of the front forks 14, a front wheel 15 is rotatably mounted.

At the rear end portion of the main frame 12, a pivot shaft 16 is mounted. To the pivot shaft 16, a rear arm 17 is swingably mounted. At the rear end of the rear arm 17, a rear wheel 18 is rotatably mounted.

The main frame 12 suspends an engine 20. At the front side of the engine 20, a radiator 2 is disposed. The engine 20 is connected to the radiator 2.

At the front side of the seat 9, a fuel tank 3 is disposed. At least a portion of the fuel tank 3 is disposed above the engine 20. The lower end portion of the fuel tank 3 extends down to the main frame 12.

Structure of Engine 20:

In this embodiment, the engine 20 is a water-cooled parallel multi-cylinder engine. More specifically, the engine 20 is a water-cooled parallel four cylinder engine. It should be noted, however, that in this embodiment, the engine is not limited to the parallel four cylinder engine. In the present invention, the engine can be, for example, an engine having parallel five or more cylinders. Still alternatively, the engine 20 can be an air-cooled engine.

The engine 20 is provided with a crankcase 22. The crankcase 22 includes an upper casing portion 22f and a lower casing portion 22g. The upper casing portion 22f and the lower casing portion 22g are abutted against each other in the up-and-down direction.

An oil pan 23 is provided below the crankcase 22. An oil reservoir (not shown) is formed in the oil pan 23. The oil reservoir is configured to store lubricating oil to be supplied to respective slide portions of the engine 20.

Figure 2:
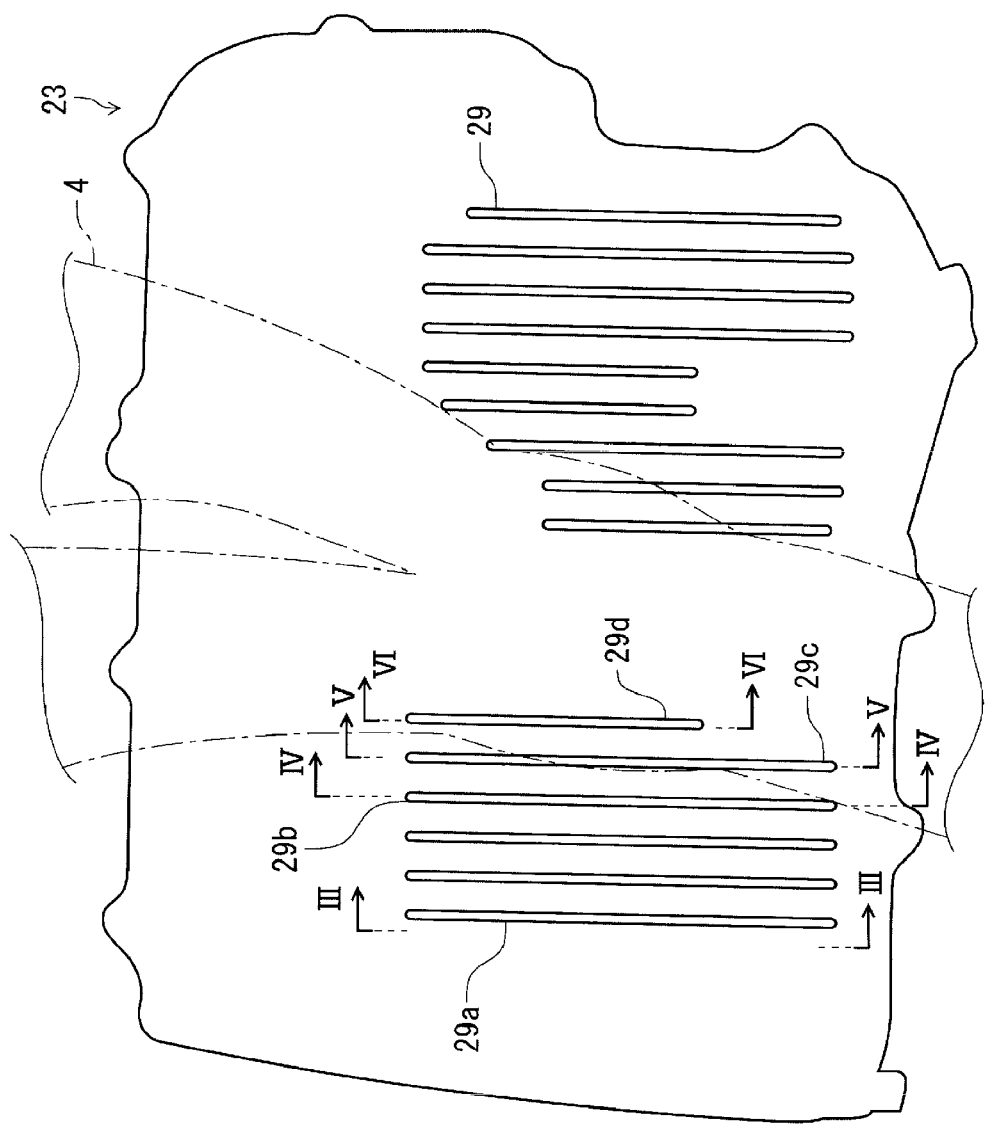
FIG. 2 is a bottom view of an oil pan.

FIG. 2 is a bottom view of the oil pan 23. The oil pan 23 is provided with a plurality of fins 29 formed on a bottom face thereof to improve the cooling efficiency of the oil pan 23.

The plurality of fins 29 are formed substantially parallel to each other so as to extend in the front and rear direction. The plurality of fins 29 are formed separately on both vehicle widthwise sides of an exhaust pipe 4 arranged below the oil pan 23. As can be seen from FIGS. 3 to 6, fins 29c and 29d located at portions overlapping with the exhaust pipe 4 are formed relatively lower in height in the plan view as compared with other fins 29a and 29b. In particular, the fin 29d located at the vehicle widthwise inner side is formed to have a relatively lower height than that of the fin 29c. Further, in the plan view, no fins 29 are formed in a portion overlapping with a central portion of the exhaust pipe 4 of the oil pan 23. This reduces the positional interference in the height direction between the fins 29 and the exhaust pipe 4, which in turn enables the exhaust pipe 4 to be disposed at a relatively higher position. Consequently, a minimum road clearance of the motorcycle 1 can be increased.

Figure 3:
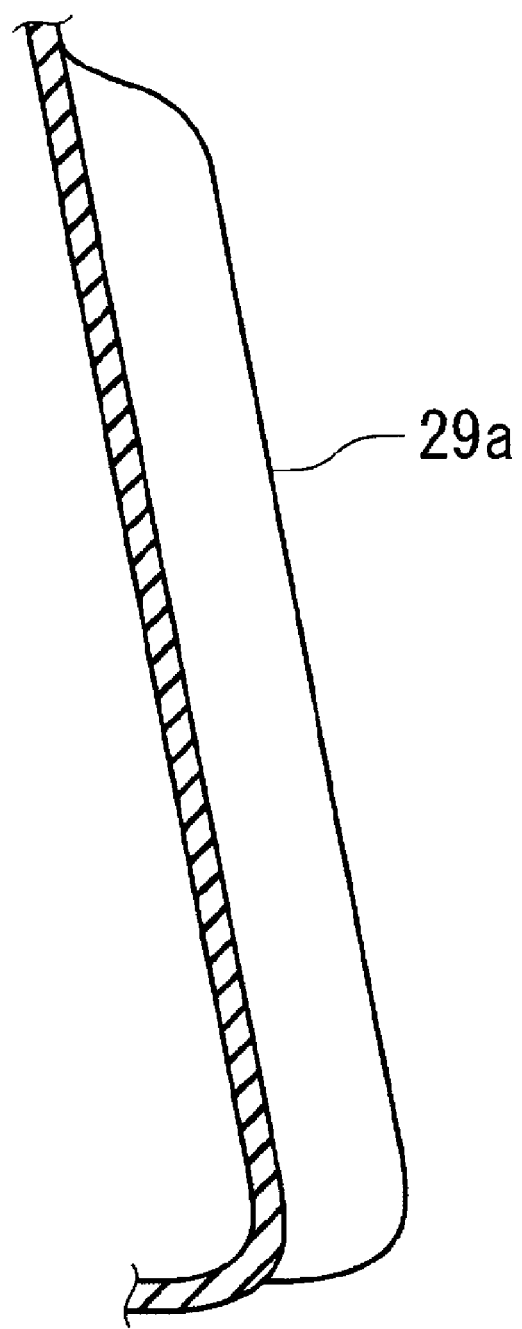
FIG. 3 is a cross-sectional view taken along the line III-III in FIG. 2.
Figure 4:
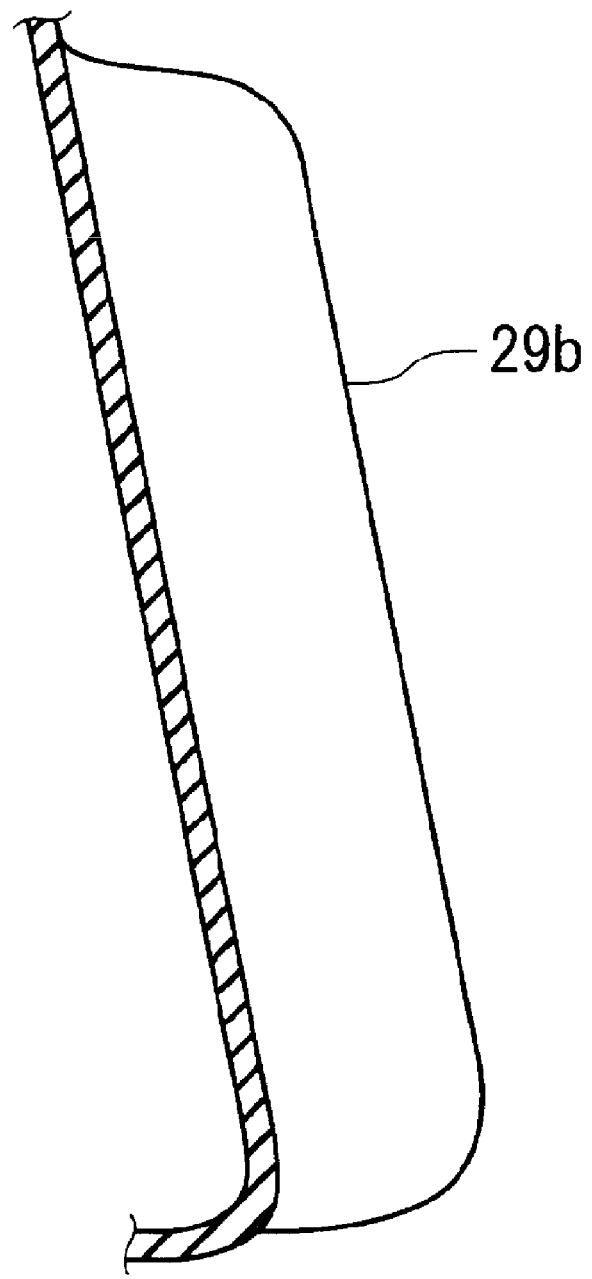
FIG. 4 is a cross-sectional view taken along the line IV-IV in FIG. 2.
Figure 5:
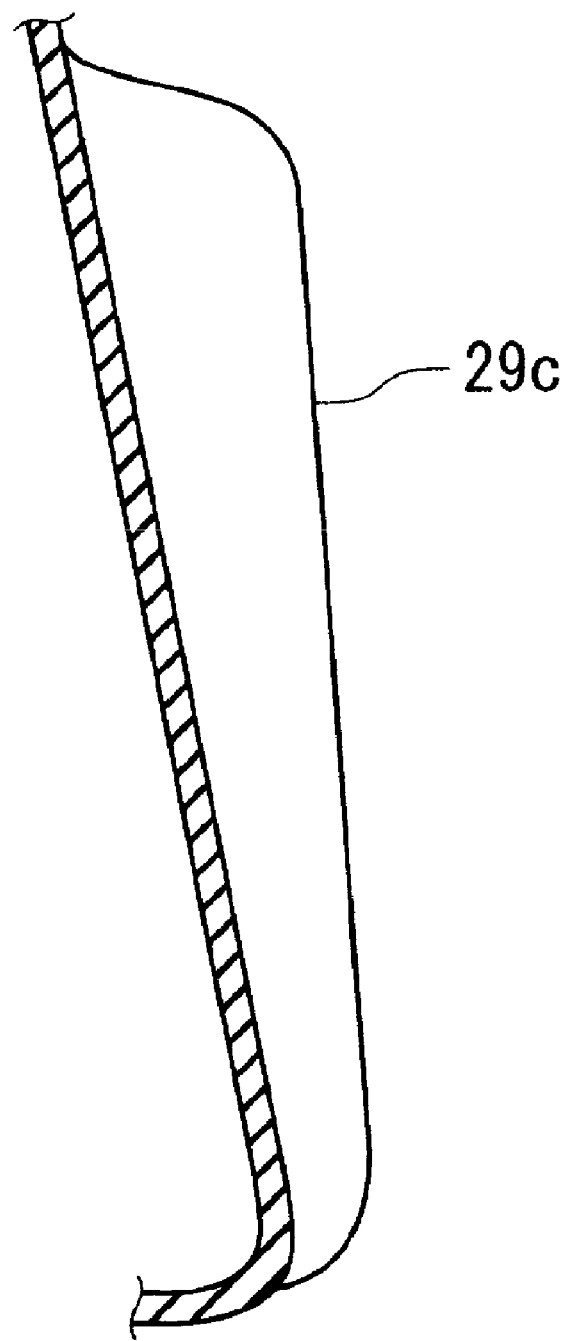
FIG. 5 is a cross-sectional view taken along the line V-V in FIG. 2.
Figure 6:
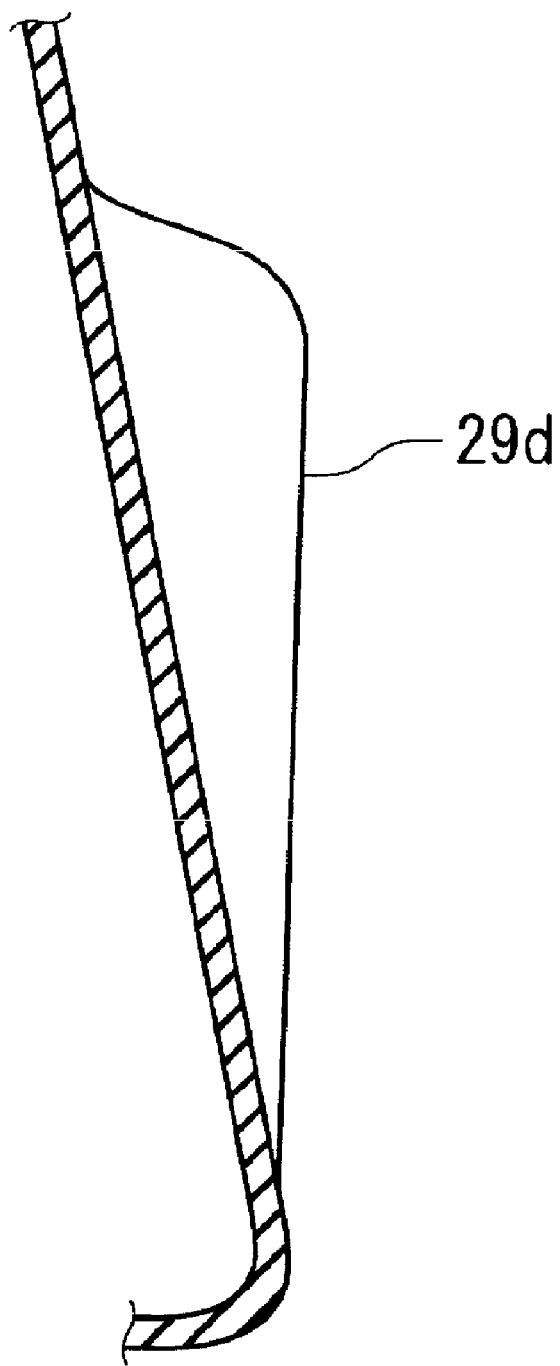
FIG. 6 is a cross-sectional view taken along the line VI-VI in FIG. 2.

As can be seen through comparison between FIGS. 3 and 4, the fin 29a located at the vehicle widthwise outer side is formed to have a height relatively lower than that of the fin 29b located at the vehicle widthwise inner side. As a consequence, in the state where the motorcycle 1 is standing upright, the distance between the lower end of the fin 29a and the ground is greater than that between the lower end of the fin 29b and the ground. Thus, the bank angle of the motorcycle 1 is designed to be large.

In this embodiment, the explanation is directed to the case in which the oil pan 23 is air-cooled. However, the oil pan 23 can be water-cooled.

As shown in FIG. 1, a body cylinder 24 is mounted on a front side portion of the crankcase 22. On an upper end portion of the body cylinder 24, a head cylinder 25 is mounted.

Figure 8:
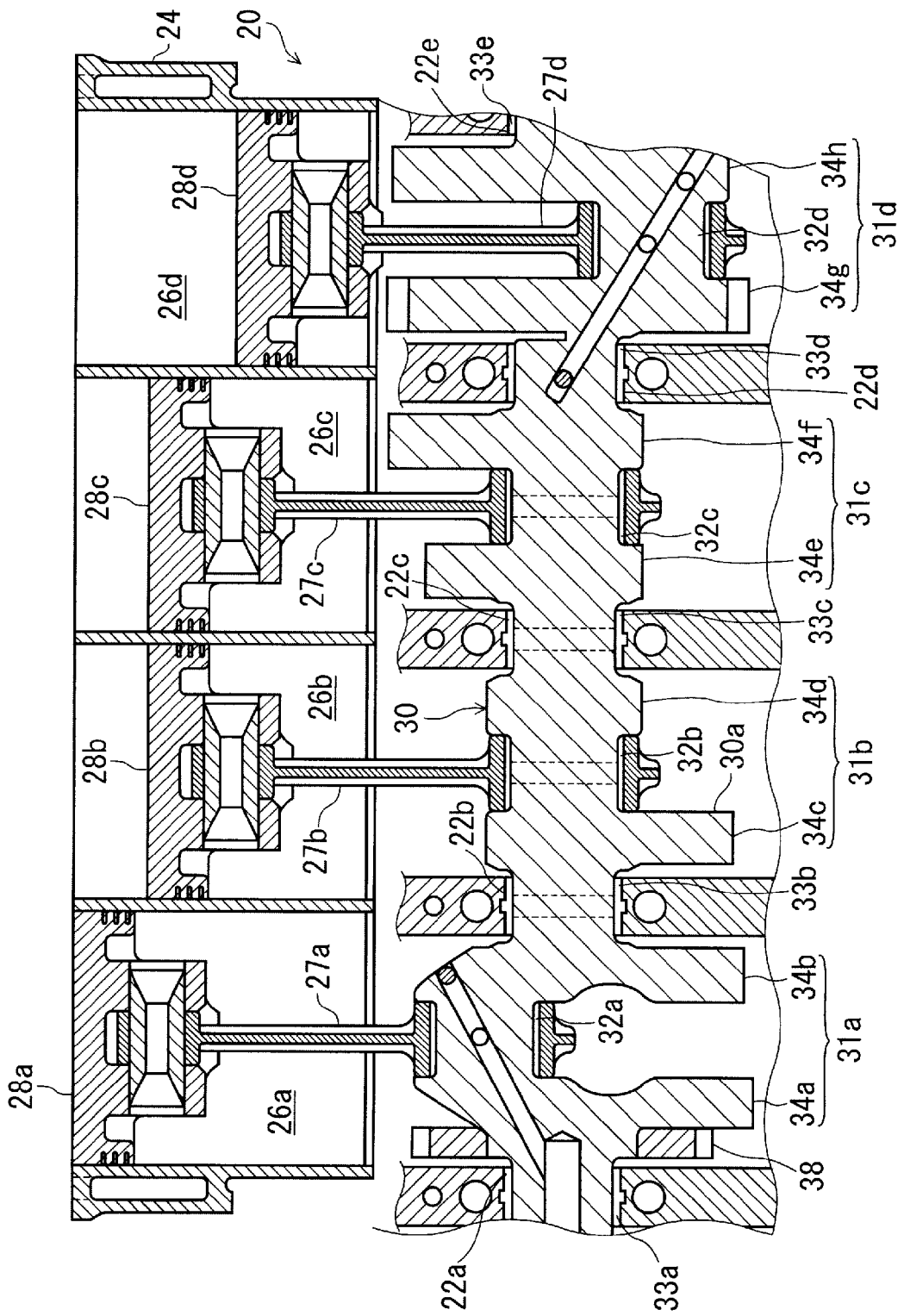
FIG. 8 is a cross-sectional view showing a portion of the engine.

As shown in FIG. 8, a crankshaft 30 is disposed inside of the crankcase 22. The crankshaft 30 extends in the vehicle width direction. More specifically, the axial direction of the crankshaft 30 extends in the vehicle width direction.

As shown in FIG. 8, the crankshaft 30 has a crankshaft body 30a and a first gear 38. The crankshaft body 30a is provided with a first crank web pair 31a, a second crank web pair 31b, a third crank web pair 31c, a fourth crank web pair 31d, a first crank pin 32a, a second crank pin 32b, a third crank pin 32c, a fourth crank pin 32d, a first crank journal 33a, a second crank journal 33b, a third crank journal 33c, a fourth crank journal 33d, and a fifth crank journal 33e.

The first crank web pair 31a is disposed at the leftmost side. The first crank web pair 31a includes a first crank web 34a and a second crank web 34b. The second crank web 34b is disposed at the vehicle widthwise right side of the first crank web 34a. The first crank web 34a and the second crank web 34b are interconnected by the first crank pin 32a extending in the vehicle width direction. At the vehicle widthwise left side of the first crank web 34a, the first crank journal 33a is disposed. The first crank web 34a is connected to the first crank journal 33a.

The second crank web pair 31b is disposed at the vehicle widthwise right side of the first crank web pair 31a. This second crank web pair 31b includes a third crank web 34c and a fourth crank web 34d. The third crank web 34c is disposed at the vehicle widthwise right side of the second crank web 34b. This third crank web 34c is connected to the second crank web 34b by the second crank journal 33b. The third crank web 34c is disposed at the vehicle widthwise right side of the second crank web 34b. The third crank web 34c and the fourth crank web 34d are interconnected by the second crank pin 32b extending in the vehicle width direction.

The third crank web pair 31c is disposed at the vehicle widthwise right side of the second crank web pair 31b. The third crank web pair 31c includes a fifth crank web 34e and a sixth crank web 34f. The fifth crank web 34e is disposed at the vehicle widthwise right side of the fourth crank web 34d. The fifth crank web 34e and the fourth crank web 34d are interconnected by the third crank journal 33c extending in the vehicle width direction. The sixth crank web 34f is disposed at the vehicle widthwise right side of the fifth crank web 34e. The sixth crank web 34f and the fifth crank web 34e are interconnected by the third crank pin 32c extending in the vehicle width direction.

The fourth crank web pair 31d is disposed at the vehicle widthwise right side of the third crank web pair 31c. The fourth crank web pair 31d is disposed at the rightmost side.

The fourth crank web pair 31d includes a seventh crank web 34g and an eighth crank web 34h. The seventh crank web 34g is disposed at the vehicle widthwise right side of the sixth crank web 34f. The seventh crank web 34g and the sixth crank web 34f are interconnected by the fourth crank journal 33d extending in the vehicle width direction. The eighth crank web 34h is disposed at the vehicle widthwise right side of the seventh crank web 34g. The eighth crank web 34h and the seventh crank web 34g are interconnected by the fourth crank pin 32d extending in the vehicle width direction. The fifth crank journal 33e is disposed at the vehicle widthwise right side of the eighth crank web 34h. The eighth crank web 34h is connected to the fifth crank journal 33e.

As shown in FIG. 8, the crankcase 22 is provided with a first bearing portion 22a, a second bearing portion 22b, a third bearing portion 22c, a fourth bearing portion 22d, and a fifth bearing portion 22e. The crankshaft 30 is rotatably supported by the first to fifth bearing portions 22a to 22e. More specifically, the first crank journal 33a is rotatably supported by the first bearing portion 22a. The second crank journal 33b is rotably supported by the second bearing portion 22b. The third crank journal 33c is rotatably supported by the third bearing portion 22c. The fourth crank journal 33d is rotatably supported by the fourth bearing portion 22d. The fifth crank journal 33e is rotatably supported by the fifth bearing portion 22e.

In this embodiment, oil supply holes (not shown) are formed in the respective bearing portions 22a to 22e. High pressure lubricating oil is supplied from an oil pump (not shown) through the respective oil supply holes. The crankshaft 30 is supported by so-called metal bearings. However, the metal bearings can be disposed between the respective bearing portions 22a to 22e and the respective crank journals 33a to 33e.

Base end portions of connecting rods 27a to 27d are connected to the respective crank pins 32a to 32d. Pistons 28a to 28d are connected to leading end portions of the respective connecting rods 27a to 27d. The pistons 28a to 28d are disposed inside of cylinders 26a to 26d formed within the body cylinder 24.

Figure 9:
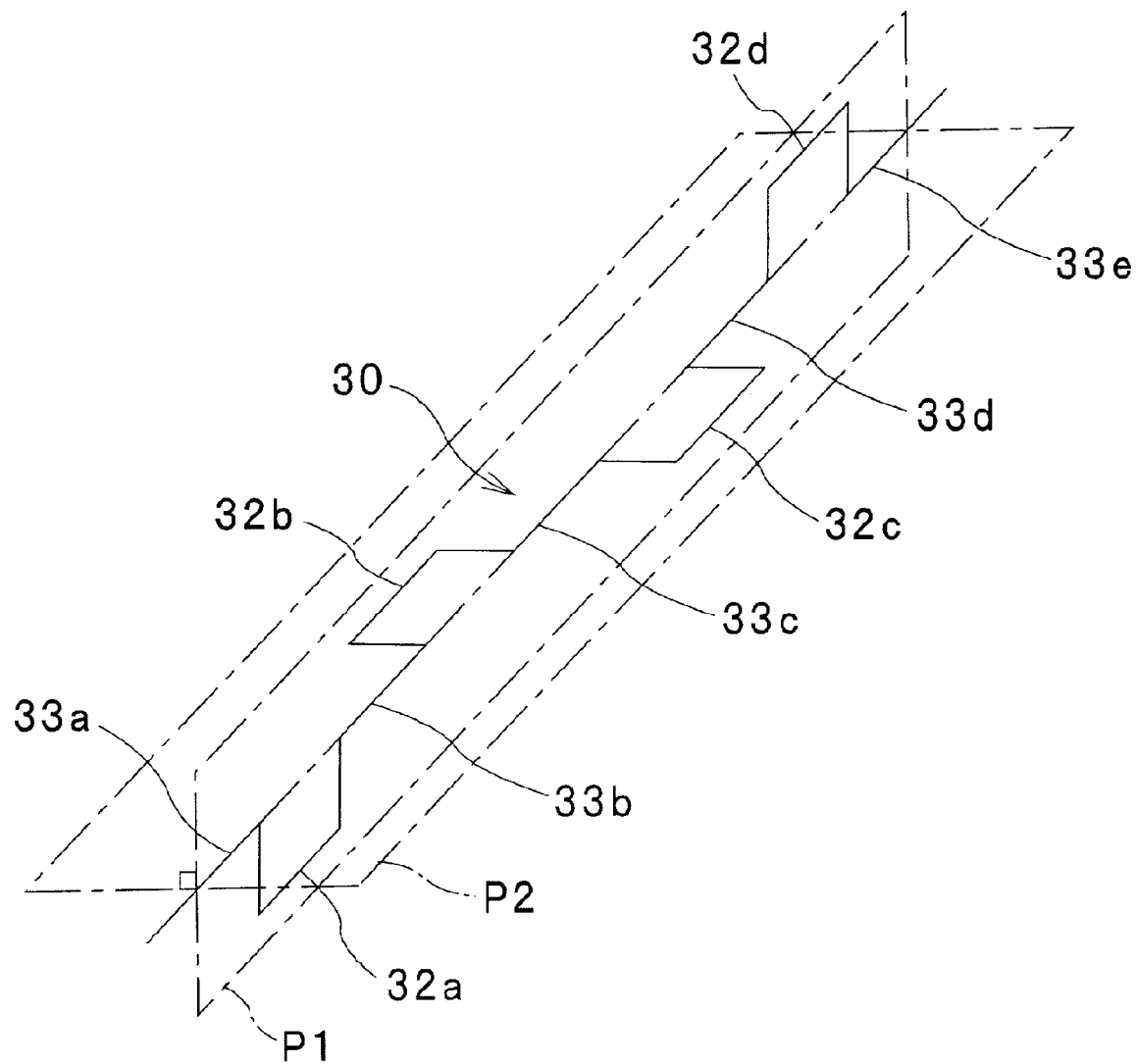
FIG. 9 is a schematic perspective view of the crankshaft of the engine.

FIG. 9 is a schematic perspective view of the crankshaft 30. As shown in FIG. 9, in this embodiment, the first crank pin 32a and the second crank pin 32b are different in phase by 90 degrees from each other. The second crank pin 32b and the third crank pin 32c are different in phase by 180 degrees from each other. The first crank pin 32a and the fourth crank pin 32d are different in phase by 180 degrees from each other.

Hence, the first crank pin 32a and the fourth crank pin 32d are located on a plane P1 passing through the axial center of the crankshaft 30. On the other hand, the second crank pin 32b and the third crank pin 32c are located on a plane P2 passing through the axial center of the crankshaft 30. The plane P1 and the plane P2 are perpendicular to each other. Thus, the first to fourth crank pins 32a to 32d are disposed on the two planes P1 and P2 passing through the axial line of the crankshaft 30. Hence, the crankshaft 30 in this embodiment is generally called a "two-plane type crankshaft."

Figure 10:
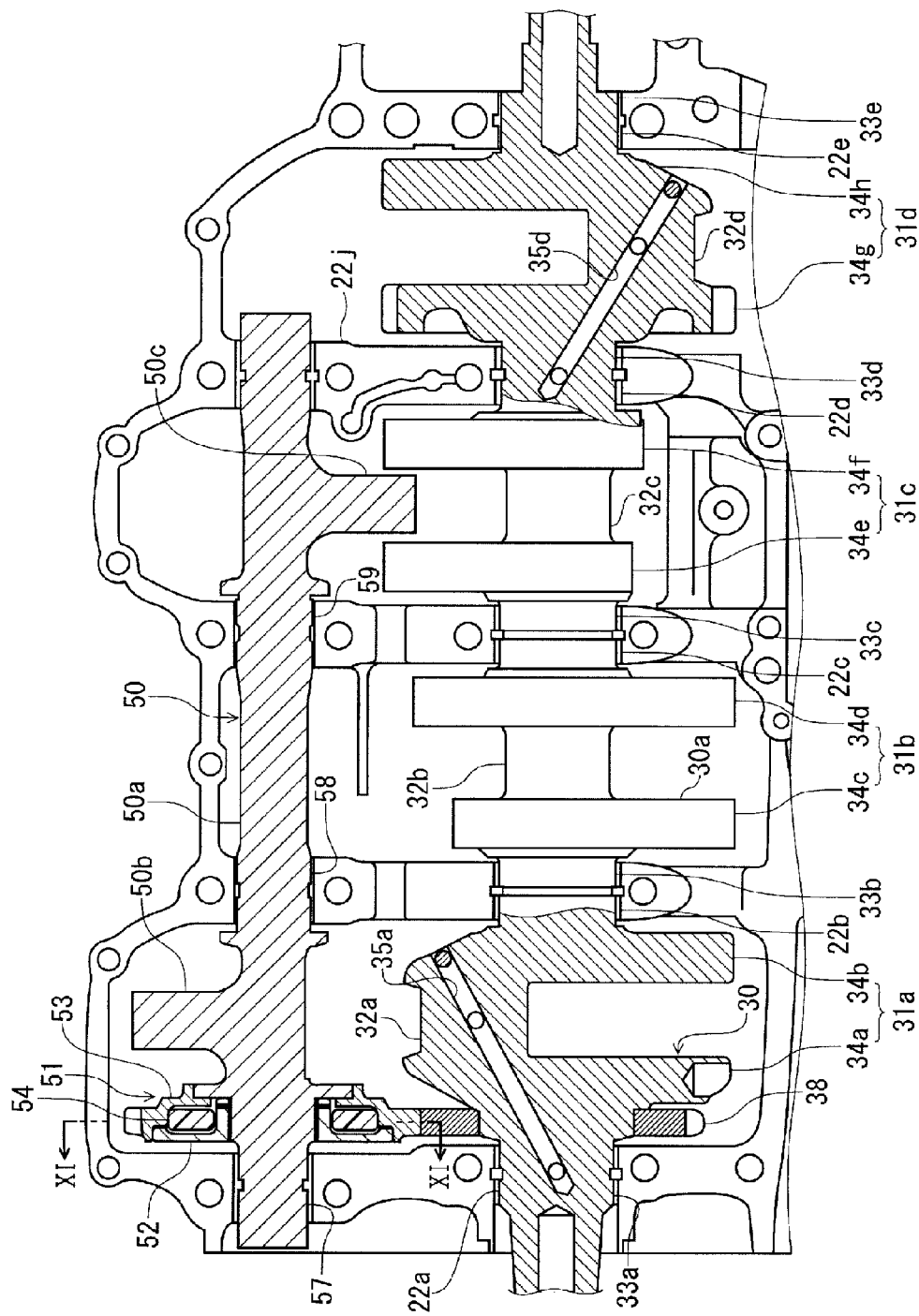
FIG. 10 is a cross-sectional view showing a portion of the engine.

As shown in FIG. 10, a first gear 38 is mounted on the crankshaft body 30a. Specifically, the first gear 38 is attached to the first crank journal 33a. More specifically, the first gear 38 is press-fitted onto the first crank journal 33a.

In this embodiment, the following explanation will be directed to an embodiment in which the first gear 38 is formed separately from the crankshaft body 30a. It should be noted, however, that the first gear 38 can be integrally formed with the crankshaft body 30a.

Further, the manner of fixing the first gear 38 to the first crank journal 33a is not specifically limited. The first gear 38 can be fixed to the first crank journal 33a in a manner other than press-fitting.

The first gear 38 is disposed at the vehicle widthwise outside of the first crank web 34a. The first gear 38 is disposed at the vehicle widthwise inside of the first bearing portion 22a. In other words, the first bearing portion 22a supports the first crank journal 33a at the vehicle widthwise outside of the first gear 38.

The first gear 38 is in engagement with a balancer shaft 50 configured to reduce the primary couple of the crankshaft 30. The balancer shaft 50 includes a balancer shaft body 50a, a first weight portion 50b, a second weight portion 50c, and a second gear 51.

The first weight portion 50b and the second weight portion 50c are disposed so that the phases are different by 180 degrees from each other. In the vehicle width direction, the first weight portion 50b is disposed between the first crank web 34a and the second crank web 34b. The second weight portion 50c is disposed between the fifth crank web 34e and the sixth crank web 34f. In the present invention, however, the number of weight portions provided on the balancer shaft 50 is not specifically limited. Further, the disposition of the weight portions in the vehicle width direction are not specifically limited.

Figure 11:
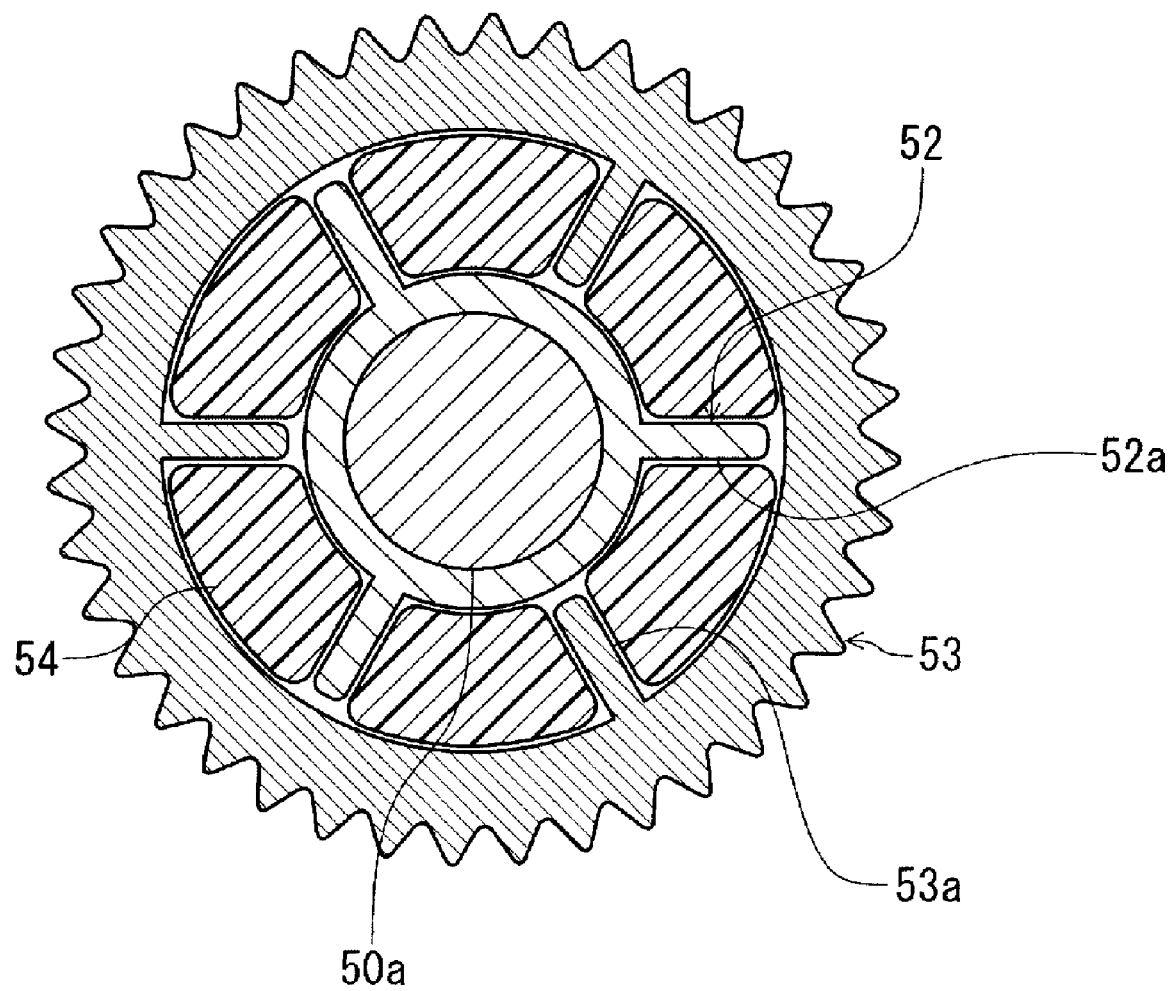
FIG. 11 is a cross-sectional view taken along the line XI-XI in FIG. 10.

The second gear 51 is mounted on the balancer shaft body 50a. As shown in FIGS. 10 and 11, the second gear 51 includes a first gear portion 52, a second gear portion 53, and a plurality of dampers 54. The first gear portion 52 is non-rotatably mounted on the balancer shaft body 50a. As shown in FIG. 11, the first gear portion 52 includes a plurality of first counter portions 52a. The plurality of first counter portions 52a are arranged at substantially same intervals along the circumferential direction. The plurality of first counter portions 52a extend radially outward from the axial center side of the balancer shaft body 50a.

The second gear portion 53 is disposed outside of the first gear portion 52. The second gear portion 53 is not displaceable with respect to the first gear portion 52 in the axial direction of the crankshaft 30. The second gear portion 53 is not rotatable with respective to the balancer shaft body 50a. The second gear portion 53 is formed into a substantially ring shape. The second gear portion 53 includes a plurality of second counter portions 53a. The plurality of second counter portions 53a are disposed at substantially same intervals along the circumferential direction. The plurality of second counter portions 53a extend radially inward.

The plurality of second counter portions 53a and the plurality of first counter portions 52a are each disposed alternately along the circumferential direction. The damper 54, which is formed of rubber, is disposed between the adjacent first and second counter portions 52a and 53a.

The crankshaft 30 is connected to a main shaft 60 via a clutch 62.

Gear teeth are formed on an outer peripheral surface of the second gear portion 53. The second gear portion 53 is in engagement with the first gear 38 press-fitted on the crankshaft 30. The gear reduction ratio between the first gear 38 and the second gear 51 is 1:1. Hence, the balancer shaft 50 rotates at a rotation speed identical to that of the crankshaft 30 in a rotary direction opposite to the rotary direction of the crankshaft 30.

Figure 7:
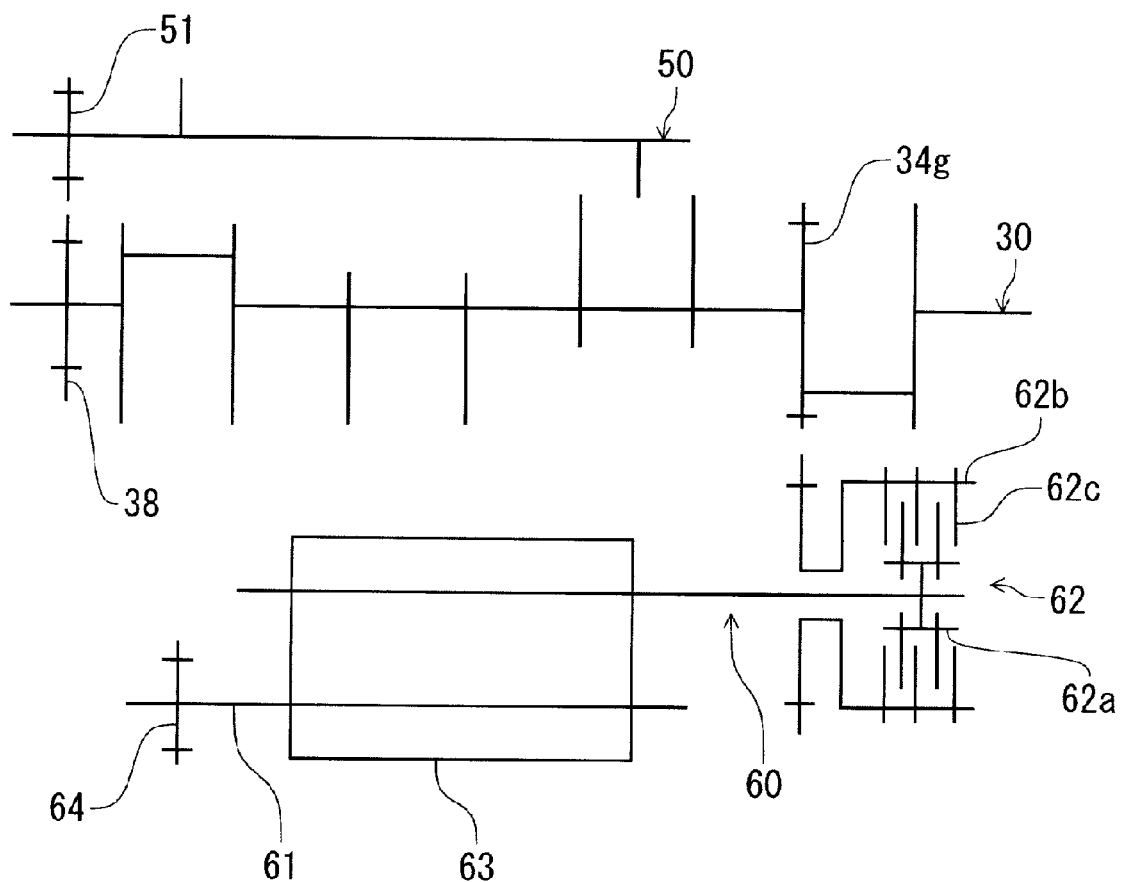
FIG. 7 is a conceptual diagram showing the axis configuration of the engine of the motorcycle.

As shown in FIGS. 7 and 8, gear teeth are formed on the outer circumference of the seventh crank web 34g. As shown in FIG. 7, the seventh crank web 34g is in engagement with a clutch 62.

The clutch 62 is provided with an inner 62a, an outer 62b, and a plate set 62c. The outer 62b is in engagement with the seventh crank web 34g. Hence, the outer 62b rotates together with the seventh crank web 34g. The inner 62a is rotatable with respect to the outer 62b. The plate set 62c is disposed between the inner 62a and the outer 62b. The plate set 62c includes a first plate set, which rotates together with the inner 62a, and a second plate set, which rotates together with the outer 62b. When the plate set 62c is not in a press-contacted state, the inner 62a is rotatable with respect to the outer 62b. When the plate set 62c is in the press-contacted state, the inner 62a rotates together with the outer 62b.

The inner 62a is connected to the main shaft 60. The main shaft 60 is disposed so as to extend in the vehicle width direction. A drive shaft 61 is disposed substantially parallel to the main shaft 60. One or more transmission gear pairs 63 are disposed between the drive shaft 61 and the main shaft 60. The rotation of the main shaft 60 is transmitted to the drive shaft 61 via the transmission gear pair 63. A drive sprocket 64 is mounted on the left end portion of the drive shaft 61. The drive sprocket 64 is connected to a driven sprocket (not shown) provided to the rear wheel 18 by a chain 5, which is shown in FIG. 1. Thereby, the rotation of the drive shaft 61 is transmitted to the rear wheel 18.

As shown in FIG. 1, in this embodiment, the balancer shaft 50, the crankshaft 30, and the drive shaft 61 are disposed such that the axial center of the balancer shaft 50, the axial center of the crankshaft 30, and the axial center of the drive shaft 61 are positioned substantially on the same straight line as seen from the side. More specifically, in this embodiment, the balancer shaft 50, the crankshaft 30, and the drive shaft 61 are disposed on a mating surface 22h between the upper casing portion 22f and the lower casing portion 22g. The main shaft 60 is disposed so that the axial center of the main shaft 60 is located at a position higher than the mating surface 22h. In this embodiment, the crankshaft 30, the main shaft 60, and the drive shaft 61 are not disposed along the same straight line in the side view. Hence, the distance between the crankshaft 30 and the drive shaft 61 is short. As a consequence, the length of the rear arm 17 can be increased. Hence, the performance of motion of the motorcycle 1 can be improved.

As described above, considering the disposition balance of the inertia mass of the crankshaft, it is preferable that the inertia mass is concentrated at the vicinity of the center of the crankshaft to reduce the force to be exerted on the crankshaft due to the torsional resonance of the crankshaft. For this reason, conventionally, in many cases, a gear engaged with a balancer shaft is disposed approximately in the vicinity of the axial center of the crankshaft.

As a result of extensive study, however, the inventor of the present invention found the fact that the force to be exerted on the crankshaft due to the torsional resonance of the crankshaft can be reduced by disposing the gear engaged with the balancer shaft outer than the crank web disposed at the vehicle widthwise outside, rather than disposing the gear engaged with the balancer shaft substantially in the vicinity of the axial center of the crankshaft. As a consequence, the inventor of the present invention has conceived the structure of this embodiment in which the gear engaged with the balancer shaft is disposed outer than the crank web disposed at the vehicle widthwise outside.

In cases where the gear to be engaged with the balancer shaft is disposed substantially in the vicinity of the axial center of the crankshaft, the axial length of the crankshaft tends to be increased. More specifically, in the case of disposing the gear for engagement with the balancer shaft substantially in the vicinity of the axial center of the crankshaft, it is required to secure a certain distance between the gear and the crank web from the viewpoint of manufacture because gear processing becomes difficult when the distance between the gear and the crank web is small. Hence, in the case of disposing the gear substantially in the vicinity of the axial center of the crankshaft, the distance between the crank web and the gear is increased in comparison with the case where the gear is disposed outer than the first crank web. Consequently, in the case of disposing the gear for engagement with the balancer shaft substantially in the vicinity of the axial center of the crankshaft, the axial length of the crankshaft tends to be increased.

Increasing the axial length of the crankshaft tends to cause increased weight of the crankshaft. Increased weight of the crankshaft causes shifting of the torsional resonance point of the crankshaft toward the low frequency side. As a result, a force in a torsional direction exerted on the crankshaft is increased at a specific rotation speed of the crankshaft. This makes it difficult to secure the reliability of the crankshaft. This in turn arises the necessity of increasing the diameter of the crankshaft in order to secure the reliability of the crankshaft. As a consequence, the weight of the crankshaft is further increased. Hence, the torsional resonance point of the crankshaft is further shifted to the low frequency side.

Therefore, it is difficult to implement a weight reduction while securing high reliability in an engine having a two-plane type crankshaft by disposing the gear for engagement with the balancer shaft substantially in the vicinity of the axial center of the crankshaft.

On the other hand, in this embodiment, the first gear 38 is arranged at the vehicle widthwise outer side of the first crank web 34a. This arrangement enables shortening of the axial length of the crankshaft 30. This in turn can reduce the weight of the crankshaft 30. Accordingly, the torsional resonance point of the crankshaft 30 can be shifted to a high frequency side. As a consequence, the force in the torsional direction to be exerted on the crankshaft 30 at the specific rotation speed can be reduced. Therefore, the weight reduction of the crankshaft 30 can be attained while securing the high reliability of the crankshaft 30.

It can be considered that the gear for engagement with the balancer shaft is formed on the outer circumferential surface of any one of the second to seventh crank webs. In such a case, the axial length of the crankshaft 30 can be reduced since no gear is require to be disposed separately.

In this case, however, the crank web on which a gear is formed cannot be caused to function as a balancer weight for cancelling, for example, the primary and secondary inertia forces and the secondary couple. This makes it difficult to cancel, for example, the primary and secondary inertia forces and the secondary couple.

Furthermore, the crank web on which a gear is formed has to be formed substantially circular in the side view. This increases the weight of the crank web on which a gear is formed as compared with the weight of the crank web with no gear.

Furthermore, in the case of forming a gear on the crank web, it is required to increase the tooth-root diameter of the gear relatively to avoid the positional interference between the crank pin and the gear. This tends to cause an increased diameter of the gear. Consequently, this in turn tends to cause an increased weight of the crank web on which a gear is formed.

Furthermore, there arises the necessity of increasing the weights of other crank webs in order to cancel, for example, the primary and secondary inertia forces and the secondary couple. Consequently, this also tends to cause an increased weight of the crankshaft.

Furthermore, the diameter of the gear is increased, which results in a relatively longer distance between the crankshaft and the balancer shaft. This makes it difficult to implement miniaturization of the engine. To the contrary, this embodiment enables relatively small diameter of the first gear 38. Accordingly, miniaturization of the engine 20 can be attained.

In cases where the gear for engagement with the balancer shaft is disposed substantially in the vicinity of the center of the crankshaft, processing of the gear is relatively difficult. To the contrary, in this embodiment, the first gear 38 is formed separately from the crankshaft body 30*a*. Hence, processing of the first gear 38 is significantly easy. Especially, in this embodiment, the first gear 38 is press-fitted onto the crankshaft body 30*a*. Hence, manufacture of the crankshaft 30 is significantly easy.

In this embodiment, the first gear 38 is disposed between the first bearing portion 22*a* and the second bearing portion 22*b* in the vehicle width direction. In other words, the crankshaft 30 is supported by the crankcase 22 on both vehicle widthwise sides of the first gear 38. Hence, as compared with the case where the first gear 38 is disposed outward of the first bearing portion 22*a*, the size of the engine 20 in the vehicle width direction can be reduced. The rotation of the crankshaft 30 can be even more stabilized.

From the viewpoint of reduction of the respective size of the first and second weight portions 50*b* and 50*c* of the balancer shaft 50, it is preferable that the first and second weight portions 50*b* and 50*c* are disposed at the vehicle widthwise outside as much as possible. More specifically, it is preferable that, in the vehicle width direction, the first weight portion 50*b* is disposed between the first and second crank webs 34*a* and 34*b*, and the second weight portion 50*c* is disposed between the seventh and eighth crank webs 34*g* and 34*h*.

Further, from the viewpoint of causing stable rotation of the balancer shaft 50, it is preferable that the balancer shaft 50 is supported by the crankcase 22 at both the left side of the first weight portion 50*b* and the right side of the second weight portion 50*c*.

However, in the case where the second weight portion 50*c* is disposed between the seventh and eighth crank webs 34*g* and 34*h* in vehicle width direction, the right front side portion of the engine will be protruded when a bearing portion for the balancer shaft 50 is provided at the right side of the second weight portion 50*c*. As a consequence, this tends to cause an increased size of the engine.

In this embodiment, the second weight portion 50*c* is disposed between the fifth crank web 34*e* and the sixth crank web 34*f* in the vehicle width direction. Hence, as shown in FIG. 10, the bearing portion 22*j* for supporting the balancer shaft 50 at the right side of the second weight portion 50*c* can be disposed relatively inward in the vehicle width direction. More specifically, the bearing portion 22*j* can be disposed at the portion inner than the seventh crank web 34*g* in the vehicle width direction. This prevents protruding of the engine 20 at the right front side. As a consequence, the engine 20 can be reduced in size.

In this embodiment, the damper 54 is disposed within the second gear 51. This enables reduction of stress between the crankshaft 30 and the balancer shaft 50. As a result, the force to be exerted on the crankshaft 30 can be further reduced.

Modified Embodiment

Figure 12:
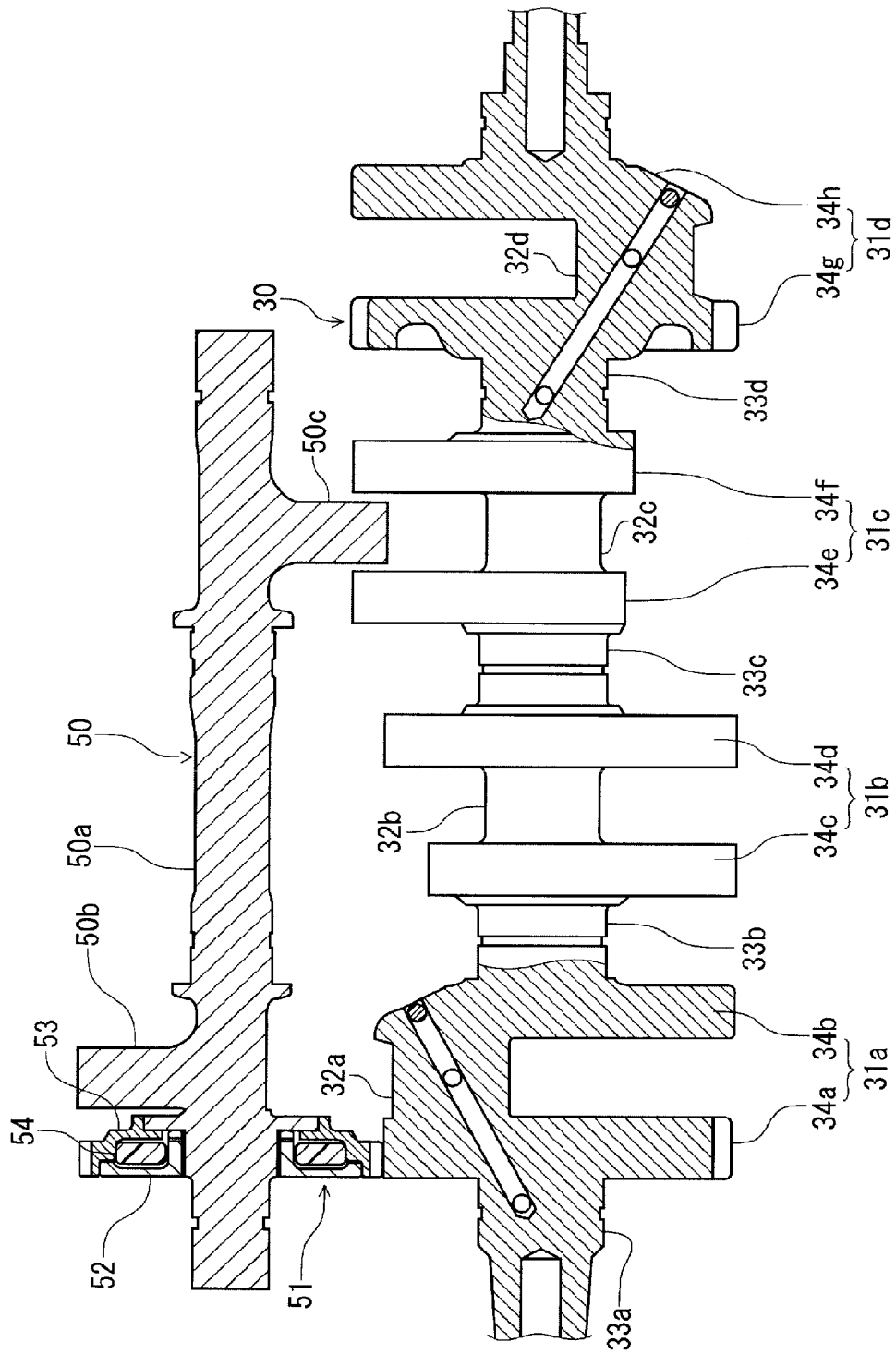
FIG. 12 is a cross-sectional view showing a portion of an engine according to a modified embodiment.
Figure 13:
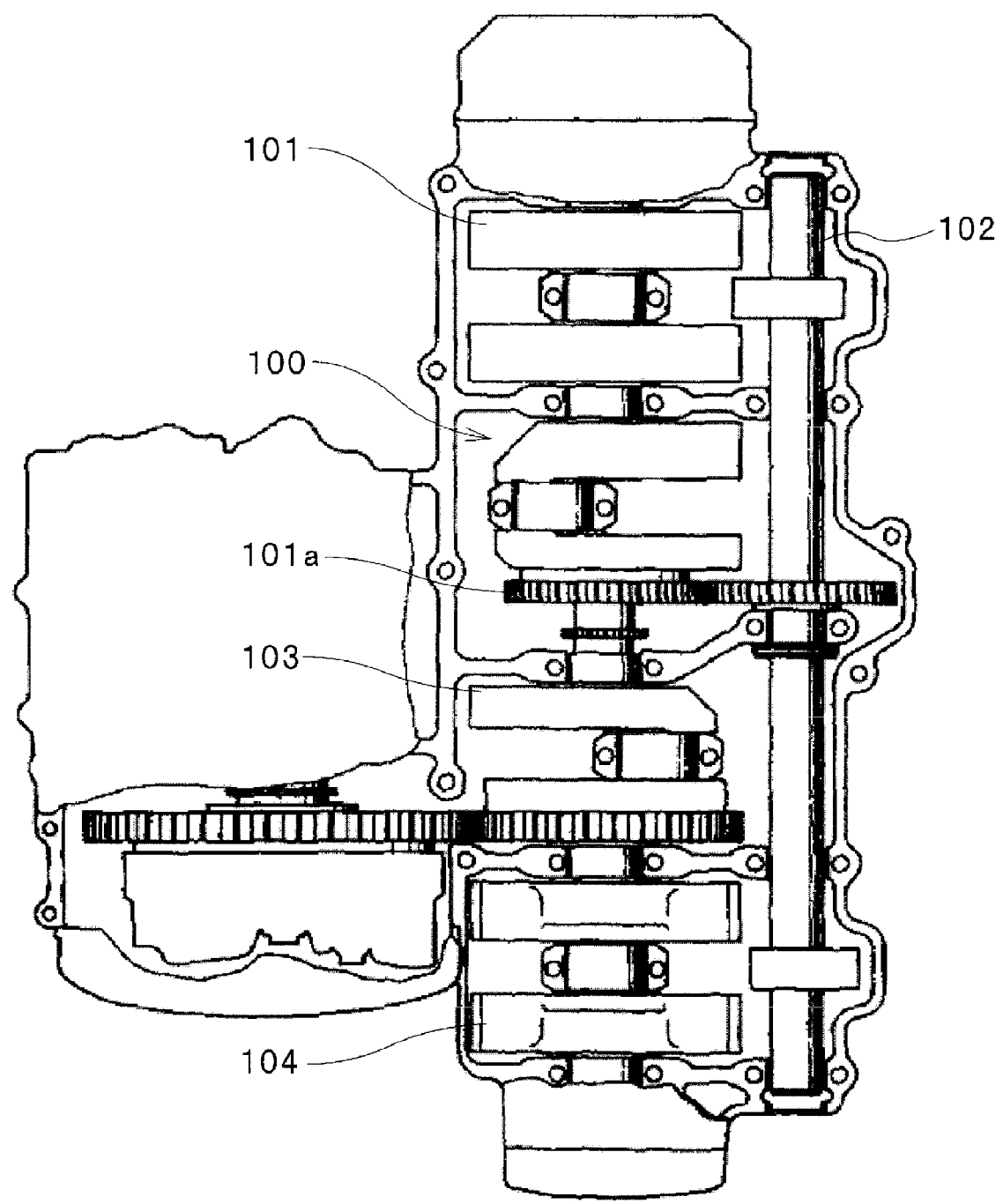
FIG. 13 is a partially broken view of an engine disclosed in Patent Document 1.

In the embodiment described above, the explanation is directed to the case in which the first gear 38 is formed separately from the crankshaft body 30*a*. However, as shown in FIG. 12, the gear for engagement with the balancer shaft 50 can be formed on the outer circumferential surface of the first crank web 34*a* or the eighth crank web 34*h*.

Even in this case, in the same manner as in the aforementioned embodiment, the weight reduction can be attained while securing the high reliability in the engine 20 having a two-plane type crankshaft 30.

In this embodiment, since the first gear 38 as a separate member is not required, the crankshaft 30 can be more shortened. Hence, further reduction of the weight of the crankshaft 30 can be attained.

In this disclosure, the "degrees" mentioned are preferably close to or at the indicated values. However, in some embodiments, the values may be about equal to the indicated values (e.g., within a range near to or within a few degrees from such values).

Broad Scope of the Invention:

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. An engine, comprising:
   a crankshaft including a crankshaft body and a first gear mounted on the crankshaft body, wherein the crankshaft includes first, second, third, and fourth crank web pairs each having a pair of crank webs and sequentially disposed from one axial end side of the crankshaft to the other axial end side thereof, a first crank pin interconnecting the pair of crank webs of the first crank web pair, a second crank pin interconnecting the pair of crank webs of the second crank web pair and different in phase by about 90 degrees from the first crank pin, a third crank pin interconnecting the pair of crank webs of the third crank web pair and different in phase by about 180 degrees from the second crank pin, and a fourth crank pin interconnecting the pair of crank webs of the fourth crank web pair and different in phase by about 180 degrees from the first crank pin; and
   a balancer shaft for reducing a primary couple of the crankshaft, the balancer shaft including a second gear engaged with the first gear,
   wherein the first gear is disposed at one axial end side of the first crank web pair.

2. The engine as recited in claim 1, wherein the first gear is formed separately from the crankshaft body.

3. The engine as recited in claim 2, wherein the crankshaft body further includes a crank journal extending from the first crank web pair to the one axial end side of the crankshaft, and wherein the first gear is press-fitted onto the crank journal.

4. The engine as recited in claim 2, further comprising a crankcase configured to store the crankshaft,
   wherein the crankshaft body further includes:
   a first crank journal extended from the first crank web pair to the one axial end side of the crankshaft and provided with the first gear mounted thereon, and
   a second crank journal interconnecting the first crank web pair and the second crank web pair, and
   wherein the crankcase includes:
   a first bearing portion supporting the first crank journal, and
   a second bearing portion supporting the second crank journal.

5. The engine as recited in claim 1, wherein the balancer shaft further includes
   a balancer shaft body having the second gear mounted thereon,
   a first weight portion that rotates with the balancer shaft body, and
   a second weight portion that rotates with the balancer shaft body and is different in phase by about 180 degrees from the first weight portion,
   wherein the first weight portion is disposed between the pair of crank webs of the first crank web pair in an axial direction of the crankshaft, and the second weight portion is disposed between the pair of crank webs of the third crank web pair in the axial direction of the crankshaft.

6. The engine as recited in claim 1,
   wherein the balancer shaft further includes a balancer shaft body having the second gear, and
   wherein the second gear includes:
   a first gear portion provided non-rotatably with respective to the balancer shaft body and including a first counter portion;
   a second gear portion provided non-rotatably with respective to the balancer shaft body and including a second counter portion opposing the first counter portion in a rotation direction of the balancer shaft; and
   a damper disposed between the first counter portion and the second counter portion.

7. An engine, comprising:
   a crankshaft including first, second, third, and fourth crank web pairs each having a pair of crank webs and sequentially disposed from one axial end side of the crankshaft to the other axial end side thereof, a first crank pin interconnect the pair of crank webs of the first crank web pair, a second crank pin interconnecting the pair of crank webs of the second crank web pair and different in phase by about 90 degrees from the first crank pin, a third crank pin interconnecting the pair of crank webs of the third crank web pair and different in phase by about 180 degrees from the second crank pin, and a fourth crank pin interconnecting the pair of crank webs of the fourth crank web pair and different in phase by about 180 degrees from the first crank pin, wherein a gear is formed on an outer crank web of the pair of crank webs of the first crank web, the outer crank web being located at one axial end side of the crankshaft; and
   a balancer shaft for reducing a primary couple of the crankshaft, the balancer including a gear engaged with the outer crank web.

8. A vehicle equipped with an engine,
   wherein the engine comprises:
   a crankshaft including a crankshaft body and a first gear mounted on the crankshaft body, wherein the crankshaft includes first, second, third, and fourth crank web pairs each having a pair of crank webs and sequentially disposed from one axial end side of the crankshaft to the other axial end side thereof, a first crank pin interconnecting the pair of crank webs of the first crank web pair, a second crank pin interconnecting the pair of crank webs of the second crank web pair and different in phase by about 90 degrees from the first crank pin, a third crank pin interconnecting the pair of crank webs of the third crank web pair and different in phase by about 180 degrees from the second crank pin, and a fourth crank pin interconnecting the pair of crank webs of the fourth crank web pair and different in phase by about 180 degrees from the first crank pin; and
   a balancer shaft for reducing a primary couple of the crankshaft, the balancer shaft including a second gear engaged with the first gear,
   wherein the first gear is disposed at one axial end side of the first crank web pair.

9. The vehicle as recited in claim 8, wherein the first gear is formed separately from the crankshaft body.

10. The vehicle as recited in claim 9, wherein the crankshaft body further includes a crank journal extending from the first crank web pair to the one axial end side of the crankshaft, and wherein the first gear is press-fitted onto the crank journal.

11. The vehicle as recited in claim 9, further comprising a crankcase configured to store the crankshaft,
    wherein the crankshaft body further includes:
    a first crank journal extended from the first crank web pair to the one axial end side of the crankshaft and provided with the first gear mounted thereon, and
    a second crank journal interconnecting the first crank web pair and the second crank web pair, and
    wherein the crankcase includes:
    a first bearing portion supporting the first crank journal, and a second bearing portion supporting the second crank journal.

12. The vehicle as recited in claim 8, wherein the balancer shaft further includes:
a balancer shaft body having the second gear mounted thereon,
a first weight portion that rotates with the balancer shaft body, and
a second weight portion that rotates with the balancer shaft body and is different in phase by about 180 degrees from the first weight portion,
wherein the first weight portion is disposed between the pair of crank webs of the first crank web pair in an axial direction of the crankshaft, and the second weight portion is disposed between the pair of crank webs of the third crank web pair in the axial direction of the crankshaft.

13. The vehicle as recited in claim 8,
wherein the balancer shaft further includes a balancer shaft body having the second gear, and
wherein the second gear includes:
a first gear portion provided non-rotatably with respective to the balancer shaft body and including a first counter portion;
a second gear portion provided non-rotatably with respective to the balancer shaft body and including a second counter portion opposing the first counter portion in a rotation direction of the balancer shaft; and
a damper disposed between the first counter portion and the second counter portion.

14. A vehicle equipped with an engine,
wherein the engine comprises:
a crankshaft including first, second, third, and fourth crank web pairs each having a pair of crank webs and sequentially disposed from one axial end side of the crankshaft to the other axial end side thereof, a first crank pin interconnect the pair of crank webs of the first crank web pair, a second crank pin interconnecting the pair of crank webs of the second crank web pair and different in phase by about 90 degrees from the first crank pin, a third crank pin interconnecting the pair of crank webs of the third crank web pair and different in phase by about 180 degrees from the second crank pin, and a fourth crank pin interconnecting the pair of crank webs of the fourth crank web pair and different in phase by about 180 degrees from the first crank pin, wherein a gear is formed on an outer crank web of the pair of crank webs of the first crank web, the outer crank web being located at one axial end side of the crankshaft; and
a balancer shaft for reducing a primary couple of the crankshaft, the balancer including a gear engaged with the outer crank web.

15. The vehicle as recited in claim 8, wherein said vehicle is a straddle type vehicle.

16. The vehicle as recited in claim 8, wherein said vehicle is a motorcycle.

* * * * *